(12) United States Patent
Kraus

(10) Patent No.: US 7,735,633 B2
(45) Date of Patent: Jun. 15, 2010

(54) VIBRATORY FEEDER

(75) Inventor: Richard Kraus, Barrington, IL (US)

(73) Assignee: Dynamic Air Inc.

(*) Notice: Subject to any disclaimer, the term of this patent is extended or adjusted under 35 U.S.C. 154(b) by 56 days.

(21) Appl. No.: 12/150,781

(22) Filed: May 1, 2008

(65) Prior Publication Data

US 2009/0272627 A1 Nov. 5, 2009

(51) Int. Cl.
*B65G 27/32* (2006.01)
(52) U.S. Cl. ..................... 198/753; 198/763
(58) Field of Classification Search ............ 198/753, 198/761, 762, 763
See application file for complete search history.

(56) References Cited

U.S. PATENT DOCUMENTS

| 4,152,255 | A | * | 5/1979 | Musschoot | 198/753 |
| 5,178,259 | A | * | 1/1993 | Musschoot | 198/753 |
| 5,713,457 | A | * | 2/1998 | Musschoot | 198/753 |
| 6,029,796 | A | * | 2/2000 | Musschoot | 198/753 |
| 7,219,792 | B2 | * | 5/2007 | Kato et al. | 198/753 |

* cited by examiner

*Primary Examiner*—James R Bidwell
(74) *Attorney, Agent, or Firm*—Jacobson & Johnson LLC

(57) ABSTRACT

A vibratory feeder for delivery of material in different directions comprising a set of vibrators that are vibrationally isolated from each other to enable activation of one of the vibrators to vibrationally direct conveyable material in a first direction and activation of another vibrator to vibrationally direct conveyable material in a second direction while at the same time the vibrators are vibrationally isolated from each other through a set of isolators.

12 Claims, 3 Drawing Sheets

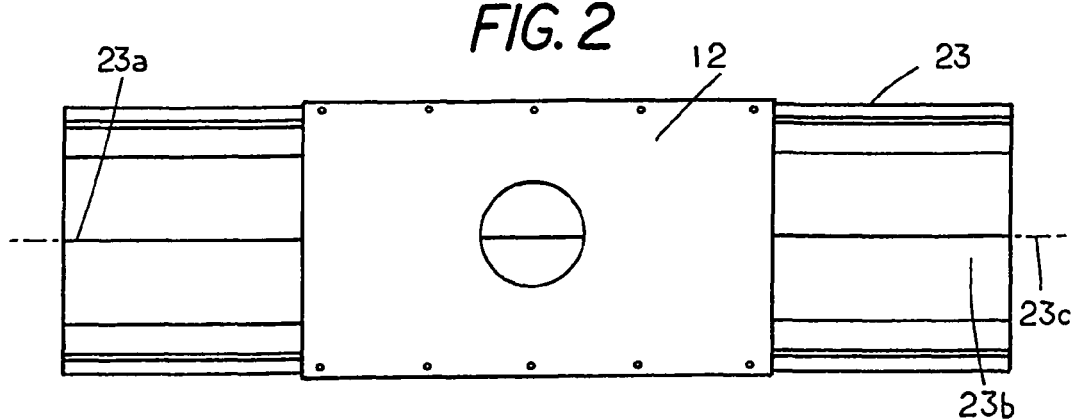
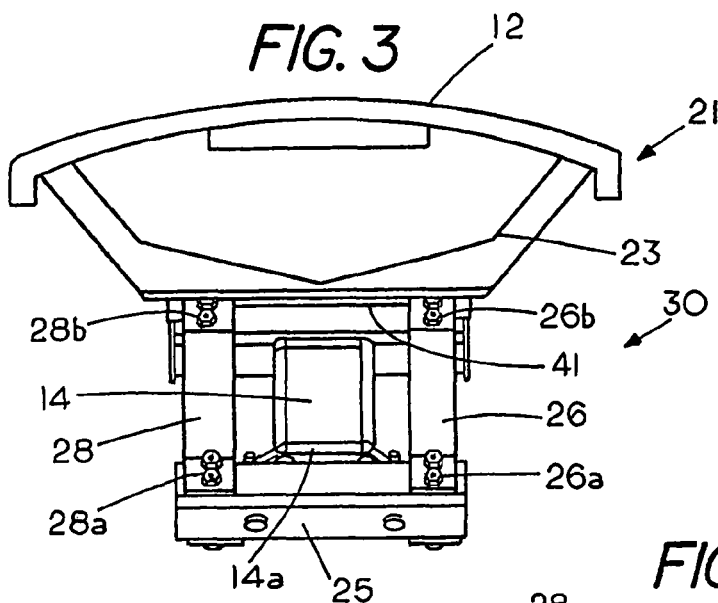
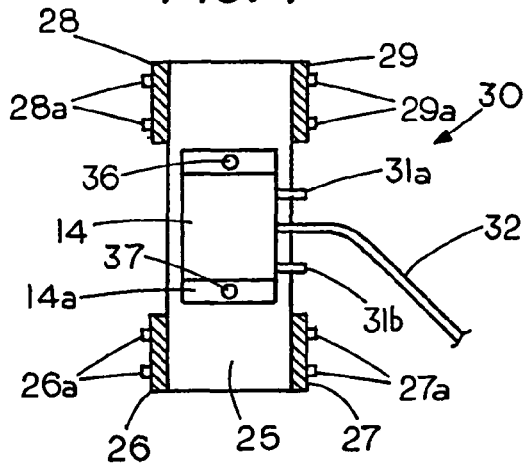

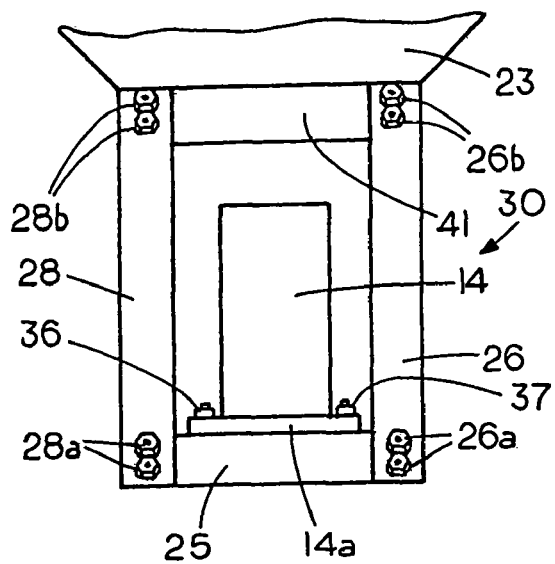
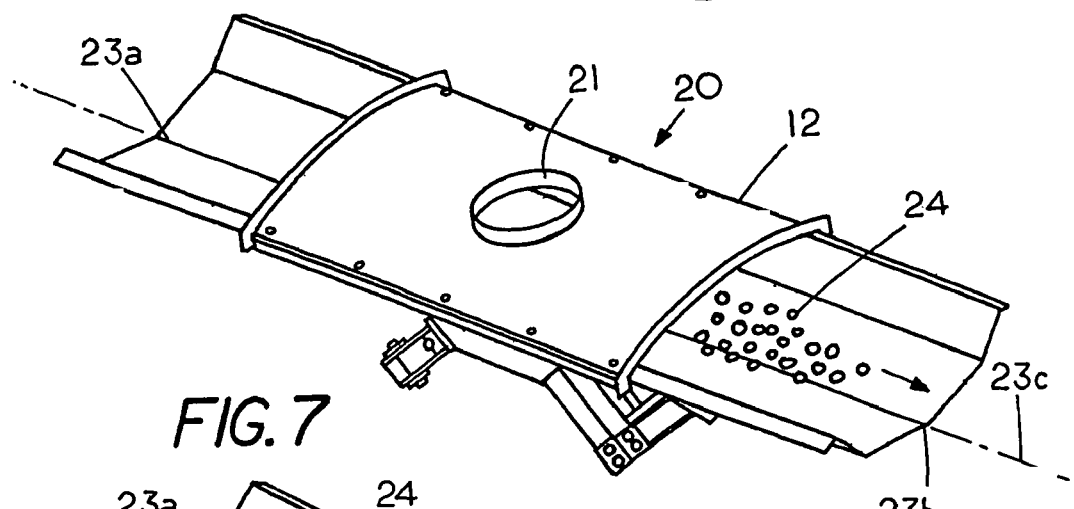
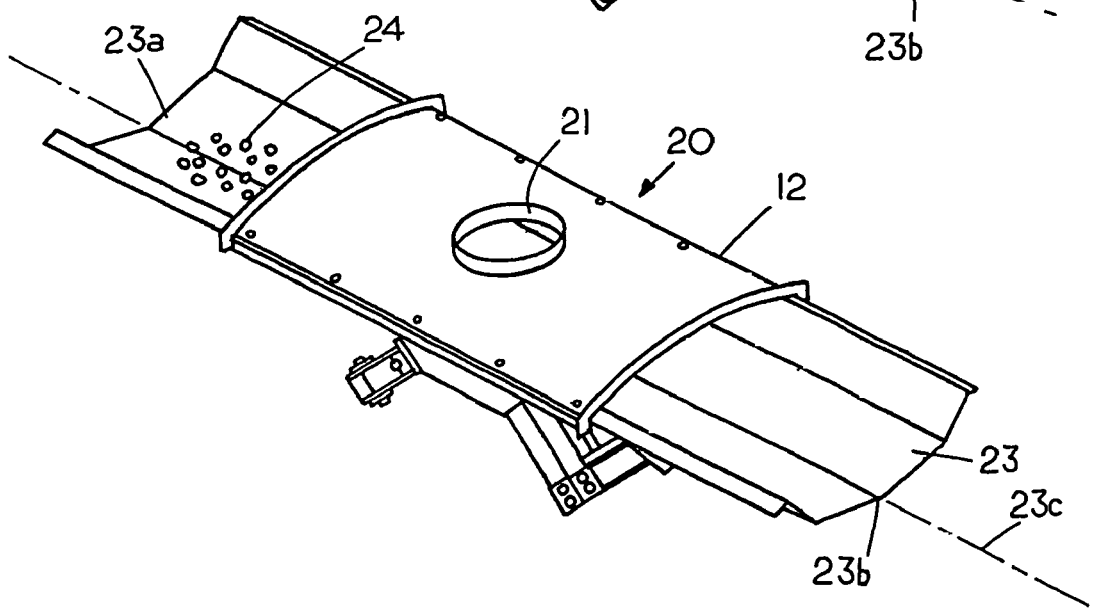

VIBRATORY FEEDER

FIELD OF THE INVENTION

This invention relates generally to feeders and, more specifically, to vibratory feeders.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

In certain conveying applications it is necessary to use a delivery chute to direct materials to two or more different locations. One method involves directing conveyable materials through a spout to a first location and then moving the spout to a different location and directing the conveyable materials through the spout to a second location direction. In order to change the deliver of conveyable materials it is necessary to mechanically change the location of the spout usually by swinging a spout from one location to another. In other applications multiple feeders may be used to direct conveyable materials to different locations. The present invention allows one to direct conveyable materials to two or more different locations through on off operation of vibrators secured to the delivery chute and without the necessity of displacing the chute.

SUMMARY OF THE INVENTION

A vibratory feeder for delivery of material to different locations comprising a set of vibrators that are vibrationally isolated from each other to enable activation of one of the vibrators to vibrationally direct conveyable material in a first direction and activation of another vibrator to vibrationally direct conveyable material in a second direction while at the same time the vibrators are vibrationally isolated from each other through a set of isolators to avoid operation of one vibrator adversely affecting the other vibrator or vice versa.

BRIEF DESCRIPTION OF THE DRAWINGS

FIG. 2 shows a top view of a chute of the vibratory feeder of FIG. 1;

FIG. 3 shows an end view of the chute and linear vibrators of the vibratory feeder of FIG. 1;

FIG. 4 shows a sectional view taken along lines 4-4 of FIG. 1;

FIG. 5 shows a view taken along lines 3-3 of FIG. 1;

FIG. 6 is a perspective view of the two way feeder chute delivering conveyable material in a first direction; and FIG. 7 is a perspective view of the two-way feeder chute delivering conveyable materiel in a second direction;

DESCRIPTION OF THE PREFERRED EMBODIMENT

Figure 1:
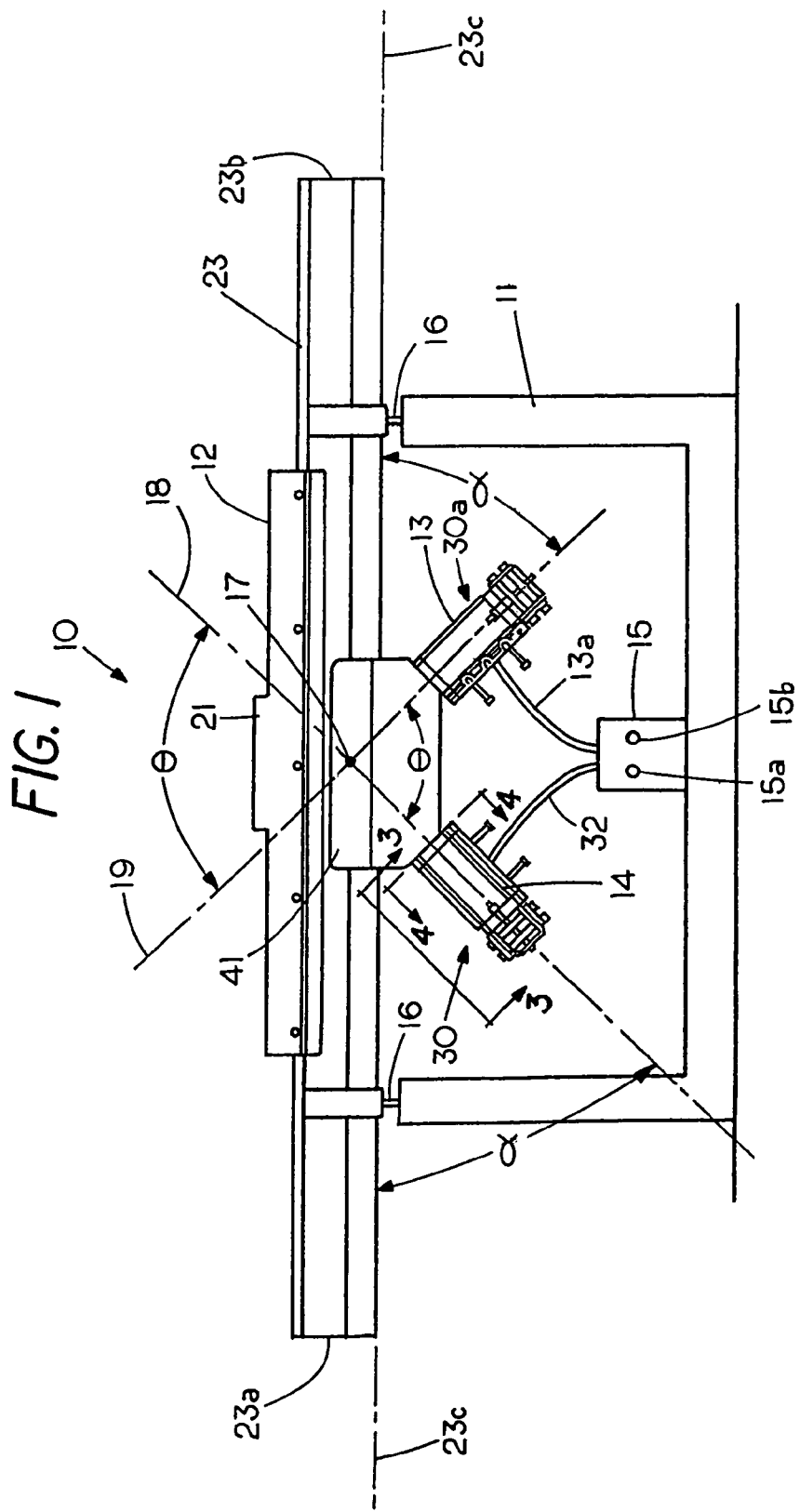
FIG. 1 shows a front view of a two way vibratory feeder.

FIG. 1 shows a front view of a two way vibratory feeder 10 comprising a stand 11 that supports a vibrator feeder assembly comprising a two way feeder chute 23 and a pair of linear vibrators 13 and 14 that are mounted below feeder chute 23 through a chute base 41 that attaches to the underside of feeder chute 23. Reference numeral 17 identifies the center of gravity of the feeder chute 23, the chute base 41, the vibrators 13 and 14 and the vibrator support 30 and 30a, which are suspended from the chute 23. Linear vibrator 14 and linear vibrator 13 are attached to chute 23 through separate mounting supports with linear vibrator 14 and linear vibrator 13 each having an axis of oscillation extending toward a center of gravity 17 of the vibratory feeder. Linear vibrator 13 is positioned at an acute angle α of about 45 degrees to a chute axis 23c and an angle of about 90 degrees to linear vibrator 14 so that when vibrator 13 is on and vibrator 14 is off vibrator 13 vibrates chute 23 to feed conveyable material along a first direction of chute 23. Similarly, vibrator 14 is positioned at an acute angle α of about 45 degrees to chute axis 23c and an angle θ of about 90 degrees to linear vibrator 13 so that when linear vibrator 14 is on and vibrator 13 is off linear vibrator 14 vibrates chute 23 to feed conveyable material along a second opposite direction of chute 23.

While chute 23 is shown as being an open ended straight trough for delivery of materials to either end of chute 23. Chute 23 may take other forms such as a conduit or the chute may take other shapes besides a straight trough, for example a curved chute. In addition, while two vibrators are secured to the chute additional vibrators may be secured to the chute.

In the preferred mounting position linear vibrator 13 and linear vibrator 14 are positioned at a right angle θ to each other and at an angle α of about 45 degrees to a chute axis 23c. These angles are considered optimum angles for transmitting vibration energy without having the vibrators adversely affecting each other. Although the suggested angles tend to be optimal angles it should be understood that the angular orientation of the vibrators to the chute axis as well as to each other may vary from optimal angles although in some cases the function of the vibratory feeder may be impaired if the deviations from optimal angles become to large.

One of the problems with use of two or more vibrators on a single chute is that the operation of one vibrator can have an adverse effect on the other vibrator. A feature of the invention herein is that the invention inhibits or prevents the vibration of linear vibrator 14 from adversely affecting the linear vibrator 13 and conversely inhibits or prevents the vibrations of linear vibrator 13 from adversely affecting the linear vibrator 14. That is, with two linear vibrators mounted to the same device when one of the vibrator is in the driving or vibratory mode it can adversely affect the other vibrator in an inactive state by causing the piston therein to contact the walls of the vibrator. With the vibratory feeder 20 the linear vibrators 13 and 14 are vibrationally isolated from one another. To vibrationally isolate the vibrators 13 and 14 from each other the vibrators 13 and 14 are preferably mounted at a right angle or at substantially a right angle θ to each other and are each supported with directional isolators that inhibit or prevent a driving vibrator from adversely affecting a passive vibrator and vice versa. While the isolators inhibit or prevent one vibrator from adversely affecting the other vibrator the isolators have a two-fold function. First, each of the isolators transmit axial vibrations from a driver vibrator to the vibrator chute 23 and second, they prevent the axial vibrations from the driver vibrator from affecting the passive vibrator. Consequently, the invention enables a driving vibrator to direct material along a first direction of a chute while at the same time the passive vibrator is inactive and inhibited from being adversely affected by vibrations from the driving vibrator.

To permit transmission of vibrations from vibrators 13 and 14 to chute 23 the ends of feeder chute 23 are shown supported by a set of vibration mounts 16 extending from stand 11. Vibration mounts 16 permit the feeder chute 23 to vibrate in response to vibration forces generated by either vibrator 13 or vibrator 14. Vibration mounts 16 are preferably a resilient material such as rubber or the like which are sufficiently rigid to support the weight of the two way feeder chute 12 and the load thereon while allowing the chute 23 to vibrate with respect to housing 11. Although compression vibration mounts 16 are shown other types of vibrationally mounts such as tension vibration mounts may be used to support or vibration suspend chute 12 while still permitting vibration of chute 16 by either vibrator 13 or vibrator 14.

Referring to FIG. 4 and FIG. 5, FIG. 5 shows a vibrator support 30 that transmits vibrations from vibrator 13 to chute 23. One end of vibrator 14 mounts to cross member 25 of vibration support 30 through a mounting plate 14a. Cross member 25 connects to cross member 41 by a set of elongated isolators 26, 28, 27 and 29 that transmit vibrations from vibrator 14 to feeder chute 23 along a central axis 18 of vibrator 13 (FIG. 1). An identical vibrator mount 31a supports linear vibrator 14 which can also transmit vibrations from vibrator 14 to feeder chute 23 along a central axis 19 of vibrator 13.

The use of isolators and the arrangement of the linear vibrators at an angle of 90 degrees or about 90 degrees to each other inhibits or prevent transmission of vibrations from driver vibrator 13 to passive vibrator 14 or vice versa from driver vibrator 14 to passive vibrator 13.

A reference to FIG. 4 and FIG. 5 shows that vibrator support 30 comprises a cross member 41 that is attached to feeder chute 23, which supports a first linear vibrator 13 and a second linear vibrator 14. FIG. 1 shows linear vibrator 13 has an axis of oscillation 19 and similarly linear vibrator 14 has an axis of oscillation 18. FIG. 1 also shows the axis of oscillation 18 of vibrator 14 and the axis of oscillation 19 of vibrator 13 extend toward the center of gravity 17 of the vibrator feeder. In the embodiment shown the linear vibrator 13 and 14 are located at an angle $\theta$ of about 90 degrees with respect to each other and an angle $\alpha$ of about 45 degrees with respect to a feed axis 23c of chute 23. The extension of the axis of oscillation of the vibrator toward the center of gravity of the vibrator feeder generates a vibrator motion in chute 23 that causes conveyable material thereon to flow therealong. For example, as illustrated in FIG. 6 when vibrator 14 is on and vibrator 13 is off the conveyable material 24 on chute 23 is directed toward end 23b of chute 23 and conversely when vibrator 13 is on (see FIG. 7) the conveyable material 24 is directed toward end 23a of chute 23. By activating vibrator 13 without activating vibrator 14 one can feed conveyable material in a first direction and conversely by activating vibrator 14 without activating vibrator 13 one can feed conveyable material in a second direction.

FIG. 1 shows that linear vibrator 13 receives a high-pressure fluid through a flexible hose 32 that connects to control unit 15. Similarly, linear vibrator 14 receives a high-pressure fluid through a flexible hose 14a that connects to linear vibrator 14. The flexible hoses, which may be rubber or the like, isolate vibrations of the vibrators 13 and 14 from the control unit 15. Control unit 15 allows one to direct high-pressure fluid to either vibrator 13 or vibrator 14. When high-pressure fluid is directed to vibrator inlet through hose 13a the mass therein begins oscillation along axis 19 thus vibrating chute 23. Similarly, when the high-pressure fluid from control unit 15 is directed into linear vibrator 14 through hose 32 the mass therein begins oscillation along axis 18 thus vibrating chute 23. The linear vibrators are known in the art and generally comprise a mass or a piston driven by a high-pressure fluid source that causes oscillation of the piston along a central axis while at the same time supporting the piston on a fluid bearing as the piston oscillates back and forth. The copending application Ser. No. 11/637,487 titled Linear Vibrator filed Dec. 16, 2006 is an example of a linear vibrator and is hereby incorporated by reference.

FIG. 2 shows a top view of the chute 23 having a hood 20 with an inlet 20a for directing conveyable material into chute 23. Chute 23 has a first end 23a and a second end 23b with each of the ends supported by vibration mounts 16. Preferably, the bottom of chute 23 extends along a horizontal plane so that conveyable material in chute 23 can be fed in either direction along chute 23.

FIG. 3 shows an end view of the vibratory feeder with a vibration support 30 supporting linear vibrator 14 and FIG. 4 shows a sectional view of vibration support 30. Vibration support 30 includes a lower cross member 25 and an upper cross member 41 that are connected to each other at the ends through a set of four isolators 26, 28, 27 and 29 which permit axial transmissions of vibrations from vibrator 14 to cross member 41 and chute 23 but inhibitor isolate vibrations imparted to chute 23 by vibrator 14 from adversely affecting vibrator 13. Similarly, vibrator 13 is isolated from vibrations from vibrator 14 when vibrator 13 imparts vibrations to chute 23.

FIGS. 3-5 show the linear vibrator 14 mounted to cross member 25 thorough a vibrator end plate 14a that is secured thereto by bolts 36 and 37 to form a rigid connection to cross member 25. A second cross member 41 attaches to chute 12 while a set of four isolation members 26, 27, 28 and 29 connect the ends of cross member 25 to the ends of cross member 41. The isolation members comprises an elongated member with a central axis extending longitudinal with the isolation member axially rigid but resilient when a force is applied at right angles to a central axis of the isolators. The axial rigidity of isolation members 26, 27, 28 and 29 allows vibration from linear vibrator 14 to be transmitted to cross member 25 which in turn transmit the vibrations through isolation members 26, 27, 28 and 29 to cross member 41 that connects to chute 23.

One end of isolation member 26 is secured to cross member 25 through bolts 26a and the other end is secured to cross member 41 through bolts 26b while one end of isolation member 28 is secured to cross member 25 through bolts 28a and the other end is secured to cross member 41 through bolts 28b. Similarly, one end of isolation member 27 is secured to cross member 25 through bolts 27a and the other end is secured to cross member 41 through bolts (not shown) while one end of isolation member 29 is secured to cross member 25 and the other end of isolation member 29 is secured to cross member 41 also through bolts not shown. While bolts are shown as the means of fasting the isolation members to the cross members other methods of fastening including but not limited to clamps, welds, rivets.

In the embodiment shown the isolation members 26, 27, 28 and 29 comprises leaf springs that are identical to each other and may be made from materials such as metal or fiberglass. In operation each of the isolation members can axially transmit a vibration from a vibrator to chute 23. For example, the vibration of chute 23 by vibrator 14 causes the conveyable material therein to be directed along chute 23 toward end 23b as illustrated in FIG. 6. Similarly FIG. 7 illustrates that when vibrator 13 is activated and vibrator 14 is inactive the vibrations generated by vibrator 13 therein cause the conveyable material 24 to flow out the end 23a of chute 23.

As pointed out herein the angles described and shown in the drawings are considered optimum angles for transmitting vibration energy without having the vibrators adversely affecting each other. It should be understood that the angles of the vibrators and the chute as well as the direction of the axis though the center of gravity need not be exact for the invention to function although in some cases the function of the vibratory feeder may be

I claim:

1. A linear vibratory feeder comprising:
   a feeder chute having a first end for a conveyable material to flow out thereof in a first direction and a second end for the conveyable material to flow out thereof in an opposite direction;
   a chute base attached to the feeder chute;
   a first linear vibrator;
   a second linear vibrator;
   a first vibrator support suspended from the chute base and a second vibrator support independent of said first vibrator support suspended from the chute base with said feeder chute, said chute base, said first linear vibrator, said second linear vibrator, said first vibrator support and said second vibrator support comprising a linear vibratory feeder having a center of gravity wherein the first vibrator support is attached to said feeder chute with said first vibrator support having a first cross member and a second cross member with said first cross member secured to the second cross member through a set of four elongated axial rigid leaf springs, said first linear vibrator having an axis of oscillation extending toward the center of gravity of the linear vibratory feeder with said first linear vibrator secured to said first cross member and the second cross member secured to the chute base to enable said first linear vibrator to transmit first axial vibrations to said chute through a rigid axis of each of said leaf springs, and said second linear vibrator having an axis of oscillation extending toward the center of gravity of the linear vibratory feeder with said second linear vibrator attached to said chute base through said second vibrator support with said second linear vibrator transmitting second axial vibrations to said feeder chute along the axis of oscillation of the second linear vibrator wherein the axis of oscillation of the second linear vibrator extends toward the center of gravity of the linear vibratory feeder with the axis of oscillation of said second linear vibrator located perpendicular or substantially perpendicular to the axis of oscillation of the first linear vibrator with said first vibrator support and said second vibrator support so that the operation of the first linear vibrator does not affect the second linear vibrator and vice versa to enable the first linear vibrator to direct material along the first direction of the chute and the second linear vibrator to direct material along the opposite direction of the chute.

2. The vibratory feeder of claim 1 including a stand and a vibration mount, said vibration mount comprising a set of compression vibration mounts supporting said vibratory feeder on said stand.

3. The vibratory feeder of claim 1 wherein the set of isolators isolating the first linear vibrator from the second linear vibrator extends parallel or substantially parallel to the axis of oscillation of the first vibrator but perpendicular or substantially perpendicular to the axis of oscillation of the second vibrator.

4. The vibratory feeder of claim 1 wherein the axis of oscillation of the first linear vibrator is located at an acute angle of about 45 degrees to an axis of the chute.

5. The vibratory feeder of claim 1 wherein the chute includes a first end and a second end with first end and second end extending in opposite directions from each other and an axis of the chute is located in a horizontal plane.

6. The vibratory feeder of claim 1 wherein the first vibrator support and the second vibrator support are located at a right angle or substantially a right angle to each other.

7. The vibratory feeder of claim 1 wherein the first vibrator support and the second vibrator support are suspended solely from the chute base.

8. A method of conveying material in different directions from the same chute comprising;
   supporting a first linear vibrator with a set of leaf springs, extending said leaf springs parallel or substantially parallel to an axis of oscillation of the first linear vibrator;
   supporting a second linear vibrator with set of leaf springs, extending said leaf springs parallel or substantially parallel to an axis of oscillation of the second vibrator;
   vibrating a chute with the first linear vibrator to direct conveyable material in a first direction while isolating the second linear vibrator connected to said chute from receiving vibrations from the first linear vibrator; and
   vibrating a chute with the second linear vibrator to direct conveyable material in a second direction while isolating the first linear vibrator connected to said chute from receiving vibrations from the second linear vibrator.

9. The method of claim 8 including the step of maintaining the chute in a horizontal plane while the coiiveyable material is directed in either the first direction or the second direction.

10. The method of claim 9 including the step of shutting off the first linear vibrator before activating the second linear vibrator and vice versa.

11. The method of claim 8 including the step of supporting the chute with a vibration mount while vibrating the chute.

12. The method of claim 8 including the step of maintaining an axis of oscillation of the first linear vibrator and an axis of oscillation of the second linear vibrator at a right angle or at substantially a right angle to each other.

* * * * *